United States Patent

[11] 3,539,075

| [72] | Inventor | Frank F. Bautista |
| | | 566 Hudson St., New York, New York 10012 |
| [21] | Appl. No. | 604,919 |
| [22] | Filed | Dec. 27, 1966 |
| [45] | Patented | Nov. 10, 1970 |

[54] DOUBLE BOILER VESSEL WITH SPOUT
1 Claim, 3 Drawing Figs.

[52] U.S. Cl. .................................... 222/531, 220/13, 220/17
[51] Int. Cl. .................................... B67d 3/00, A47j 27/10
[50] Field of Search .................................... 99/144, 235(A); 220/44, 10, 13, 9, 17, 85(spouts); 222/517, 531

[56] References Cited
UNITED STATES PATENTS

| 1,405,070 | 1/1922 | Osborn | 99/144 |
| 2,708,436 | 5/1955 | Foster | 220/10X |
| 966,661 | 8/1910 | Daniels | 220/13 |
| 980,956 | 1/1911 | Hulbert | 220/17 |
| 989,287 | 4/1911 | Phipps | 220/17 |
| 1,962,284 | 6/1934 | Dante | 220/85(spouts)UX |
| 2,637,459 | 5/1953 | Jordan | 220/13 |

FOREIGN PATENTS

| 25,950 | 9/1905 | Great Britain | 99/144 |

OTHER REFERENCES

Chao, How to Cook and Eat in Chinese, John Day Co. New York, 1945 p.110.

*Primary Examiner*—George E. Lowrance

ABSTRACT: A vessel for preparing and dispensing a viscous sweet and sour sauce having an inner container for the ingredients to be prepared and dispensed and an outer pot to hold boiling water wherein both the pot and container have a unitary cover for cooking and dispensing purposes.

Patented Nov. 10, 1970      3,539,075
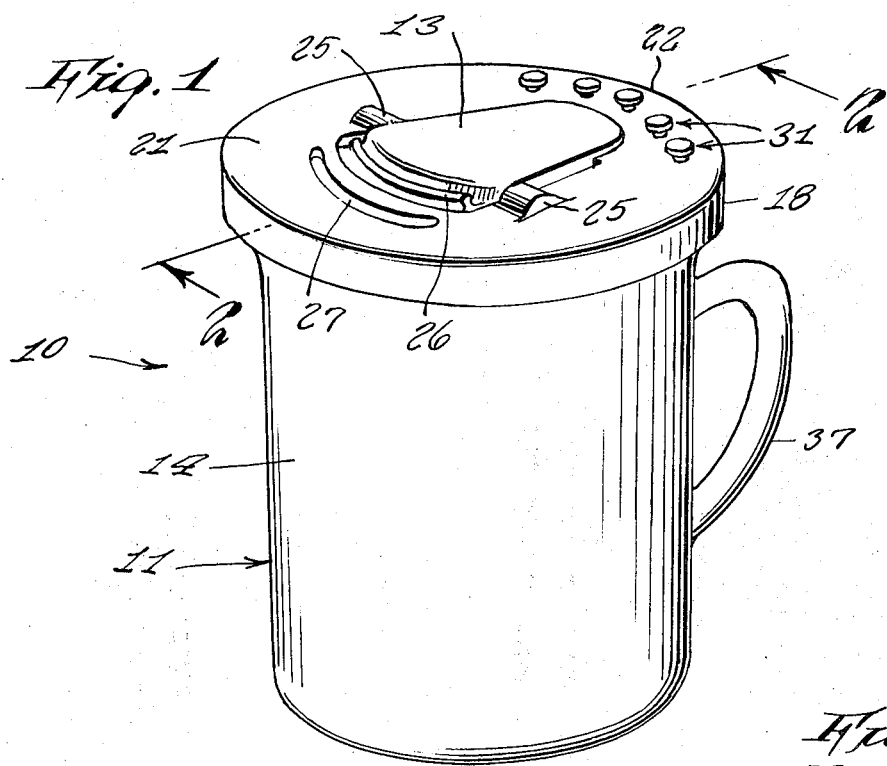
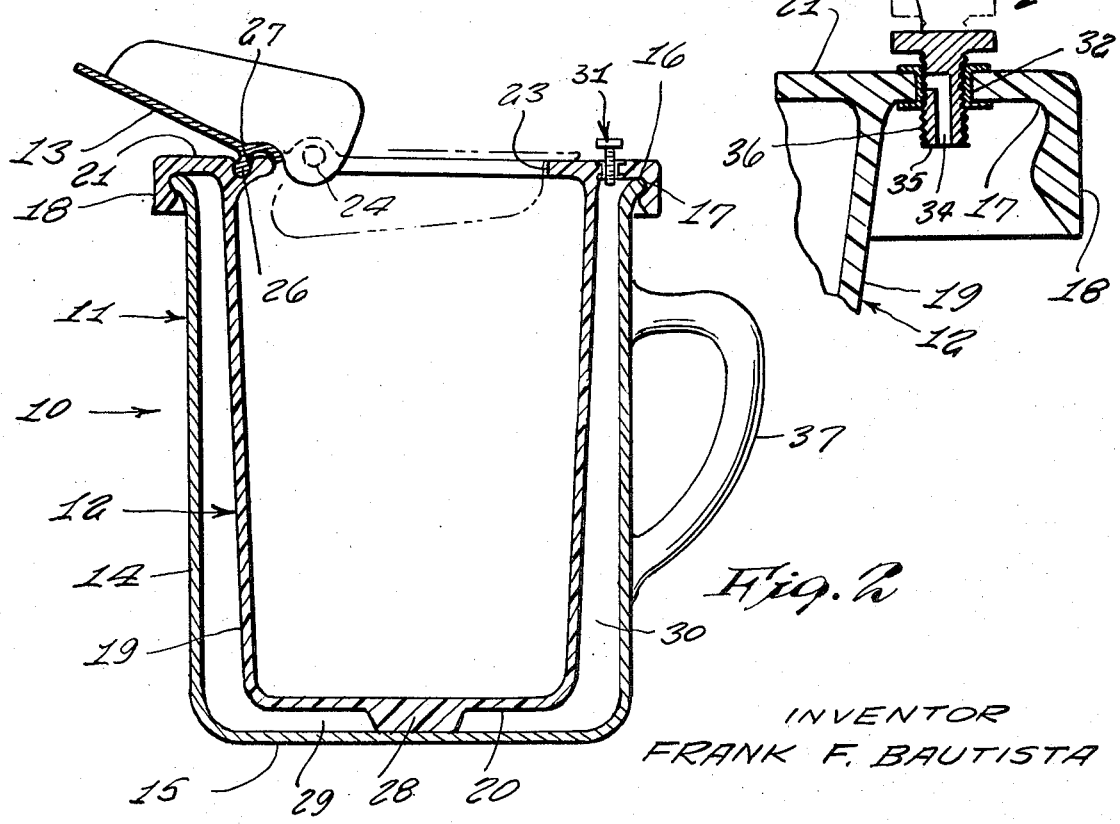
INVENTOR
FRANK F. BAUTISTA

3,539,075

DOUBLE BOILER VESSEL WITH SPOUT

This invention relates to sauces and to the manufacture of sauces.

A principal object of the present invention is to provide a novel sauce that may be used on meats, for imparting an improved flavor thereto.

Another object is to provide a novel sauce that is equally adaptable for use on various different meats, such as smoked or unsmoked pork products and on fowl.

Another object is to provide a sauce for use on meats such as roast pork slices, spare ribs, ham steaks, roast turkey slices and roast chicken.

Yet another object is to provide a vessel within which the above sauce may be properly prepared so that all the desired characteristics and quality of the sauce may be attained.

Other objects are to provide a novel sauce and a vessel for preparation of the sauce which is simple in design, inexpensive to manufacture, rugged in construction, easy to use and efficient in operation.

These and other objects will be readily evident upon a study of the following specification and the accompanying drawing wherein:

FIG. 1 is a perspective view of a vessel used for preparing the present sauce,

FIG. 2 is a cross-sectional view taken on the line 2-2 of FIG. 1, and

FIG. 3 is an enlarged detail of a part of the structure illustrated in FIG. 2.

Referring now to the drawing in detail, the reference numeral 10 represents a vessel in which the present sauce invention is prepared by placement therein of the ingredients comprising the sauce and then cooking the same.

In the present invention, the sweet and sour sauce is made from a new recipe which is as follows:

8 oz. lime juice.
4 oz. orange juice.
4 oz. honey.
3 oz. brown sugar.
¼ teaspoon cinnamon.
5 oz. Jamaica dark rum.
2 oz. corn starch.

The lime juice and the orange juice are poured into the vessel 10 and is then heated over a slow fire until it is hot, but not brought to a boil. Then the honey is added thereto. Thereafter the brown sugar, the cinnamon, and the Jamaica dark rum are added. Then the corn starch is mixed with 4 oz. cold water and slowly poured into the above mixture while the mixture is being continuously stirred and until it becomes thick in consistency, but not brought to a boil. The preparation is then ready for placement upon the meat as desired.

The vessel 10, within which the above ingredients are placed and heated, is provided with double boiler type characteristics, and includes an outer pot 11, and inner pot 12 received in spaced apart relation within the outer pot, and a cover 13 that provides access to the inner pot for purpose of placement of the ingredients thereinto.

The outer pot 11 is of generally cylindrical configuration, having a cylindrical side wall 14 and flat, circular bottom wall 15. The upper edge 16 of the side wall is outwardly flared for snap securement into a circular recess 17 formed on the innerside of a flange 18 integrally formed in the inner pot 12.

The inner pot 12 is of like cylindrical configuration, having a cylindrical side wall 19, a flat, circular bottom wall 20, and a circular flat top wall 21 that extends outwardly beyond the diameter of the side wall and which includes at its periphery 22, the downwardly extending flange 18 that fits over the top edge of the outer pot to enclose the same.

An opening 23 is provided in the top wall 21, and the pivotable cover 13 is movable to close the opening, the cover having sidewardly extending pins 24 in axial alignment and supported in bearings 25 formed on top wall 21. An arcuate bead 26 formed on the cover is receivable snap-fit within a corresponding arcuate groove 27 formed on the top wall 21 when the cover is in a fully opened position, as shown in FIG. 2, so that the cover may serve as a pouring spout, the bead and groove providing a sealed junction between the parts to prevent dripping.

A foot 28 is integrally formed on the bottom of the bottom side 20 and serves as a spacer between the bottom walls 20 and 15 so to assure water circulation space 29 therebetween. Space 30 between the side walls 14 and 19 additionally serves for water circulation between the pots. Thus the pots form a double boiler with water in the outer pot surrounding the inner pot to prevent burning of the sauce contained within the inner pot.

A plurality of valves 31 are provided in the top wall 21 to allow controlled escape of steam generated by the water within the outer pot. Each valve 31 comprises a threaded bushing 32 fitted in the top wall 21 and a threaded screw 33 threadingly secured in the bushing. An L-configurated passage 34 in the screw communicates between a bottom wall 35 of the screw and the threaded side wall 36 thereof.

When a screw 33 is raised sufficiently, the passage 34 permits steam from within the pot to escape outwardly therefrom.

The outer pot 11 has a handle 37 for conveniently lifting the vessel to pour out the finished sauce.

In operative use, the inner pot is removed from the outer pot and a quantity of water is placed into the outer pot after which the inner pot is replaced. The cover 13 is opened and the ingredients are added into the inner pot according to the above recipe and the pot is then heated over a stove. The valves are regulated between an open and closed position, as preferred, for controlling steam. During the heating process the cover may be opened so to permit stirring. After the sauce is finished in preparation, the cover can be snapped into spout position and the sauce poured out of the vessel.

While various changes may be made in the detail construction, it is understood that such changes will be within the spirit and scope of the present invention as is defined by the appended claims.

I claim:

1. A vessel for preparing and dispensing a viscous sauce, comprising a double boiler type vessel having an inner container and an outer pot spaced from and encompassing said inner container, said outer pot having a cylindrical side wall, a flat bottom wall, a handle on said side wall, the upper edge of said side wall being outwardly flared, said inner container comprises a cylindrical side wall, a bottom wall and a top wall, said top wall extends diametrically outwardly from said inner container and having a downward extending flange at its outer edge, a circular recess formed in the inner side of said flange receiving said outwardly flared upper edge of said outer pot in a snap fit, an opening in said top wall communicating with the interior of said inner container, a cover closing said opening, a pin extending from either side of said cover, said pins being in axial alignment and pivotally received in bearings form on said top wall, an arcuate bead on said cover, and a corresponding arcuate groove on said top wall for receiving said bead when said cover is in a fully open position whereby the cover may function as a spout.